(12) United States Patent
Jiang et al.

(10) Patent No.: US 7,556,587 B2
(45) Date of Patent: Jul. 7, 2009

(54) HILL HOLD FOR A VEHICLE

(75) Inventors: Hong Jiang, Canton, MI (US); Ron Cowan, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 435 days.

(21) Appl. No.: 11/649,487

(22) Filed: Jan. 4, 2007

(65) Prior Publication Data

US 2007/0111856 A1    May 17, 2007

(51) Int. Cl.
*B60W 10/02* (2006.01)
(52) U.S. Cl. ...................................... 477/174
(58) Field of Classification Search ................. 477/172, 477/174, 901
See application file for complete search history.

(56) References Cited

U.S. PATENT DOCUMENTS

| | | | |
|---|---|---|---|
| 5,519,617 A | 5/1996 | Hughes et al. | |
| 6,370,466 B1 | 4/2002 | Hada et al. | |
| 6,457,454 B1 | 10/2002 | Gras | |
| 6,482,123 B2 | 11/2002 | Steeby | |
| 6,590,299 B2 | 7/2003 | Kuang et al. | |
| 6,616,572 B2 | 9/2003 | Suzuki | |
| 6,896,340 B2 * | 5/2005 | Kinser et al. | 303/192 |
| 2003/0043032 A1 | 3/2003 | Jung | |
| 2004/0033861 A1 | 2/2004 | Wheeler et al. | |

* cited by examiner

*Primary Examiner*—Dirk Wright
(74) *Attorney, Agent, or Firm*—David B. Kelley; MacMillan, Sobanski & Todd, LLC

(57) ABSTRACT

A vehicle hill hold may be accomplished, for a vehicle having an automated clutch between the engine output and the transmission input, while protecting the clutch from potential excess wear due to overheating. A hill hold may be accomplished by increasing an accelerator pedal position sensitivity and switching the clutch between fully engaged and fully disengaged based on changes in the pedal position.

18 Claims, 4 Drawing Sheets

HILL HOLD FOR A VEHICLE

CROSS REFERENCE TO RELATED APPLICATIONS

This application claims the benefit of U.S. nonprovisional patent application Ser. No. 11/037,960, filed Jan. 18, 2005, which is incorporated herein by reference.

BACKGROUND OF INVENTION

The present invention relates to clutches employed with vehicle transmissions, and more particularly to preventing overheating of such clutches.

Dry clutches connected between the engine output and the transmission input are conventionally employed with vehicles having manual transmissions. The engagement of these clutches are controlled by a vehicle operator pressing on or releasing a clutch pedal. While these conventional manual transmissions have some drawbacks relative to conventional automatic transmissions—the need for the vehicle operator to actuate the clutch pedal and manually shift gears—they are still employed due to some inherent advantages. Namely, a conventional clutch and manual transmission is typically less expensive than a conventional automatic transmission and torque converter, and the conventional manual transmission arrangement does not have the energy losses associated with the torque converter.

Consequently, attempts have been made to develop a one or two clutch and manual type of transmission arrangement that will operate like an automatic transmission—an automated manual transmission or a powershift transmission. That is, employ a vehicle controlled clutch and gear shifting system, but without a torque converter or the more complex planetary gear sets and shift mechanisms of a conventional automatic transmission. One significant concern with these new systems, however, is the potential for heat build-up in the clutch while the vehicle is in a hill hold mode (i.e., the transmission is in a forward gear and the vehicle operator uses the accelerator pedal to maintain the vehicle at a stand still on a hill). In order for the engine to be running while the vehicle is in gear and not moving, there must be slippage somewhere along the drive line. In the conventional automatic transmission arrangement, the torque converter allows for this slippage by shearing the fluid therein, with the torque converter readily having the thermal capacity to absorb and dissipate the excess heat generated. But for an automated type transmission with a clutch instead of a torque converter, the clutch will create the slippage, which creates heat build-up in the clutch. This heat build-up can occur relatively quickly, and can approach temperatures that may cause significantly increased wear and possibly damage the clutch.

To overcome the heat build-up concern, some have devised audible or visual warning systems to alert the vehicle operator if the clutch temperature is too high. But the vehicle operator may ignore the warnings. Others have suggested the addition of one-way clutches or other transmission hardware to accomplish a hill hold function, but these types of solutions add to the cost and complexity of the transmission. Another suggested method for overcoming this concern is to rapidly and automatically engage and disengage the clutch to cause the drivetrain to pulsate in an attempt to encourage the vehicle operator to release the accelerator pedal and actuate the brake pedal. However, such pulsation being felt throughout the vehicle may cause concern for both the vehicle operator and other occupants. Yet another suggested method that attempts to overcome this concern is one where, above a certain temperature, the clutch will fully engage, thus causing the vehicle to move forward and the vehicle operator to engage the brake pedal to stop the forward movement. But this method may also cause a concern for the vehicle operator or vehicle occupants.

Thus, it is desirable to have an automated manual transmission with a hill hold function that prevents overheating of a clutch while avoiding many of the drawbacks of the prior art.

SUMMARY OF INVENTION

An embodiment of the present invention contemplates a method of performing a hill hold on a vehicle having a clutch that selectively connects an output of an engine to an input of a transmission. The method may comprise the steps of: detecting the vehicle is in a hill hold situation; automatically increasing an accelerator pedal position sensitivity for an accelerator pedal in an electronic throttle control system if the vehicle is detected to be in the hill hold situation; detecting an increase or a decrease in a position of the accelerator pedal; automatically fully engaging the clutch if the increase in the position of the accelerator pedal is detected; and automatically fully disengaging the clutch if the decrease in the position of the accelerator pedal is detected.

An embodiment of the present invention contemplates a method of performing a hill hold on a vehicle having a clutch that selectively connects an output of an engine to an input of a transmission. The method may comprise the steps of: detecting the vehicle is in a hill hold situation; automatically increasing an accelerator pedal position sensitivity for an accelerator pedal in an electronic throttle control system if the vehicle is detected to be in the hill hold situation; detecting an increase or a decrease in a position of the accelerator pedal; automatically fully engaging the clutch if the increase in the position of the accelerator pedal is detected; automatically fully disengaging the clutch if the decrease in the position of the accelerator pedal is detected; detecting the position of the accelerator pedal to be greater than a predetermined vehicle launch pedal position; reducing the pedal position sensitivity to an initial pedal position sensitivity if the position of the accelerator pedal is detected to be greater than the predetermined vehicle launch pedal position; and automatically engaging the clutch if the clutch is disengaged when step (f) occurs.

An embodiment of the present invention contemplates a vehicle that may comprise an engine having an electronically controlled throttle and an output; a transmission having an input; a clutch having a clutch input operatively engaging the output of the engine, a clutch output operatively engaging the input of the transmission, and a clutch actuator for selectively engaging the clutch input to the clutch output; an accelerator pedal having a pedal position sensor; and a control unit in communication with the clutch actuator, pedal position sensor and electronically controlled throttle, and including a hill hold clutch protector that detects when the vehicle is in a hill hold situation, and when a hill hold situation is detected increases an accelerator pedal position sensitivity for the accelerator pedal, fully engages the clutch if an increase in a position of the accelerator pedal is detected and fully disengages the clutch if a decrease in the position of the accelerator pedal is detected.

An advantage of an embodiment of the present invention is that an automated manual transmission may operate in a hill hold situation while avoiding potential excessive wear or damage to the clutch.

Another advantage of an embodiment of the present invention is that the method can be performed without requiring the addition of transmission hardware to accomplish the hill hold function.

A further advantage of an embodiment of the present invention is that the hill hold function may be performed without creating potential concern to the vehicle operator. The protection of the clutch during a hill hold situation is accomplished without generating warning alerts to the vehicle operator or causing the vehicle to pulsate.

DETAILED DESCRIPTION

Figure 1:
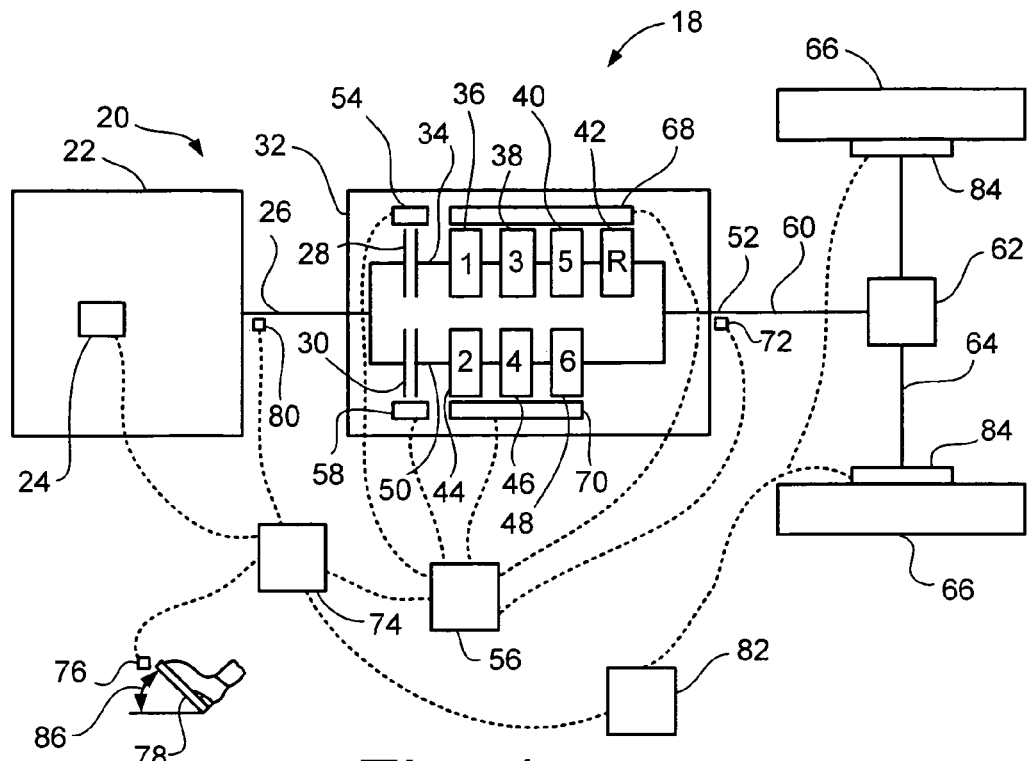
FIG. 1 is a schematic diagram of a portion of a vehicle powertrain in accordance with an embodiment of the present invention.

FIG. 1 illustrates a portion of a vehicle 18, having a vehicle powertrain 20 that includes an engine 22, with an electronically controlled throttle 24 and an engine output shaft 26. The engine 22 may be a conventional gasoline or diesel engine, or some other type of engine if so desired. The output shaft 26 splits in two and is coupled to a first clutch 28 and a second clutch 30. The first and second clutches 28, 30 are preferably dry clutches but may also be wet clutches instead, and may be located within a transmission 32 or adjacent to the transmission 32. The transmission includes a transmission output shaft 52 that connects to the rest of the powertrain 20, which may include a drive shaft 60, differential 62, axle 64, and wheels/tires 66. While the configuration appears generally as a rear wheel drive arrangement, the present invention is equally applicable to a front wheel drive arrangement as well.

The transmission 32 is preferably a type that has gear sets similar to those of a conventional manual transmission rather than gear sets similar to those of a conventional automatic transmission. The transmission 32 is also preferably configured as a powershift transmission in which the odd numbered gear ratios—a first gear 36, a third gear 38, a fifth gear 40, and possibly a reverse gear 42—are driven via an output 34 from the first clutch 28; and the even numbered gear ratios—a second gear 44, a fourth gear 46, and a sixth gear 48—are driven via an output 50 from the second clutch 30. When the transmission 32 is operating in one of the odd gears, the first clutch 28 is engaged and the second clutch 30 is disengaged, which allows for even numbered gear shifting. Then, the first clutch 28 is disengaged while the second clutch 30 is engaged so the transmission 32 is now operating in one of the even numbered gears. Accordingly, this arrangement allows for torque delivery through the transmission 32 to the transmission output shaft 52 even during shifting. While the powertrain 20 employs a powershift transmission 32, the present invention may also be applied to other types of transmissions, such as, for example, automated manual transmissions, where clutch overheating during a hill hold situation may present a concern.

Through electronically controlled actuators, the engagement and disengagement of the first and second clutches 28, 30, as well as shifting of the gears, is preferably automated. A first clutch actuator 54 regulates the first clutch 28 and is electronically controlled by a transmission control unit 56, and a second clutch actuator 58 regulates the second clutch 30 and is also electronically controlled by the transmission control unit 56. The dashed lines in FIGS. 1 and 2 indicate electric or other types of communication between components. A first gear actuator 68 manipulates the odd and reverse gears 36, 38, 40, 42, and a second gear actuator 70 manipulates the even gears 44, 46, 48, with both being controlled by the transmission control unit 56. The transmission control unit 56 also connects to a sensor 72 for detecting the speed at the output of the transmission 32. The sensor 72 can be employed for determining the speed of the vehicle, or, if so desired, a different sensor that forms part of an antilock brake or traction control system may be employed for determining the speed of the vehicle. The transmission control unit 56 is also in communication with an engine control unit 74. Alternatively, the transmission control unit 56 may be integral with the engine control unit 74.

The engine control unit 74 is also in communication with and controls the electronic throttle control 24 as well as a sensor 76 for detecting the position or angle 86 of the accelerator pedal 78. An engine output sensor 80 can detect the speed of the engine output shaft 26 and is also in communication with the engine control unit 74. An antilock brake and traction control unit 82 also communicates with the engine control unit 74. The antilock brake and traction control unit 82 is in communication with and controls vehicle brakes 84. The antilock brake and traction control unit 82 may have just antilock brake capabilities, just traction control capabilities or both, so long as automated control of the brakes is available. Also, while this control unit 82 is shown as separate from the engine control unit 74, it may also be integral therewith. In addition, while only two vehicle brakes 84 are illustrated, this system is applicable to all four brakes on a vehicle. The engine control unit 74 and antilock brake and traction control unit 82, as well as other sensors and subsystems to which they connect, will not be described in any detail herein since the design and functioning thereof are known to those skilled in the art.

Figure 2:
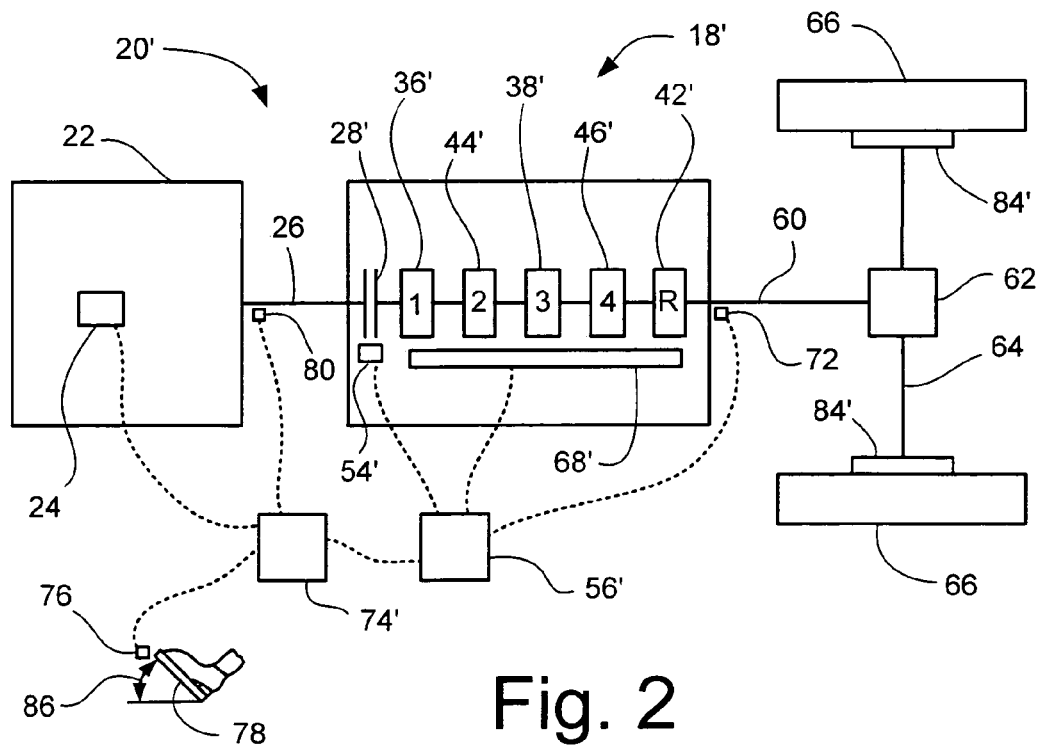
FIG. 2 is a schematic diagram, similar to FIG. 1, but illustrating a second embodiment of the present invention.

FIG. 2 illustrates a second embodiment of the present invention. This embodiment is similar to the first, but illustrates a different transmission arrangement and does not include an antilock brake or traction control system. Accordingly, for elements in this embodiment that are the same as the first embodiment, the same element number will be used, but for elements that have changed, the element number will include an added prime. For the vehicle powertrain 20', the engine 22, engine output shaft 26, driveshaft 60, differential 62, axle 64 and wheels/tires 66 may be the same as in the first embodiment. The brakes 84' are manually actuated by the driver depressing a brake pedal (not shown) but cannot be automatically actuated. The engine control unit 74' still communicates with the electronically controlled throttle 24, accelerator pedal position sensor 76, engine output sensor 80, and transmission control unit 56'. The accelerator pedal position sensor 76 again measures the position or angle 86 of the accelerator pedal 78.

The transmission control unit 56' communicates with the clutch actuator 54', which regulates the clutch 28', the transmission output sensor 72, and the gear actuator 68', which manipulates the forward and reverse gears 36', 38', 42', 44', 46'. The transmission 32' illustrated in this second embodiment is an automated manual transmission rather than a powershift transmission as in the first embodiment, illustrating that the vehicle hill hold may be used with different types of transmissions that employ an automatically actuated clutch rather than a torque converter. Alternatively, if so desired, the vehicle 18' may also include an antilock brake and/or traction control system, as illustrated in FIG. 1.

Figure 3:
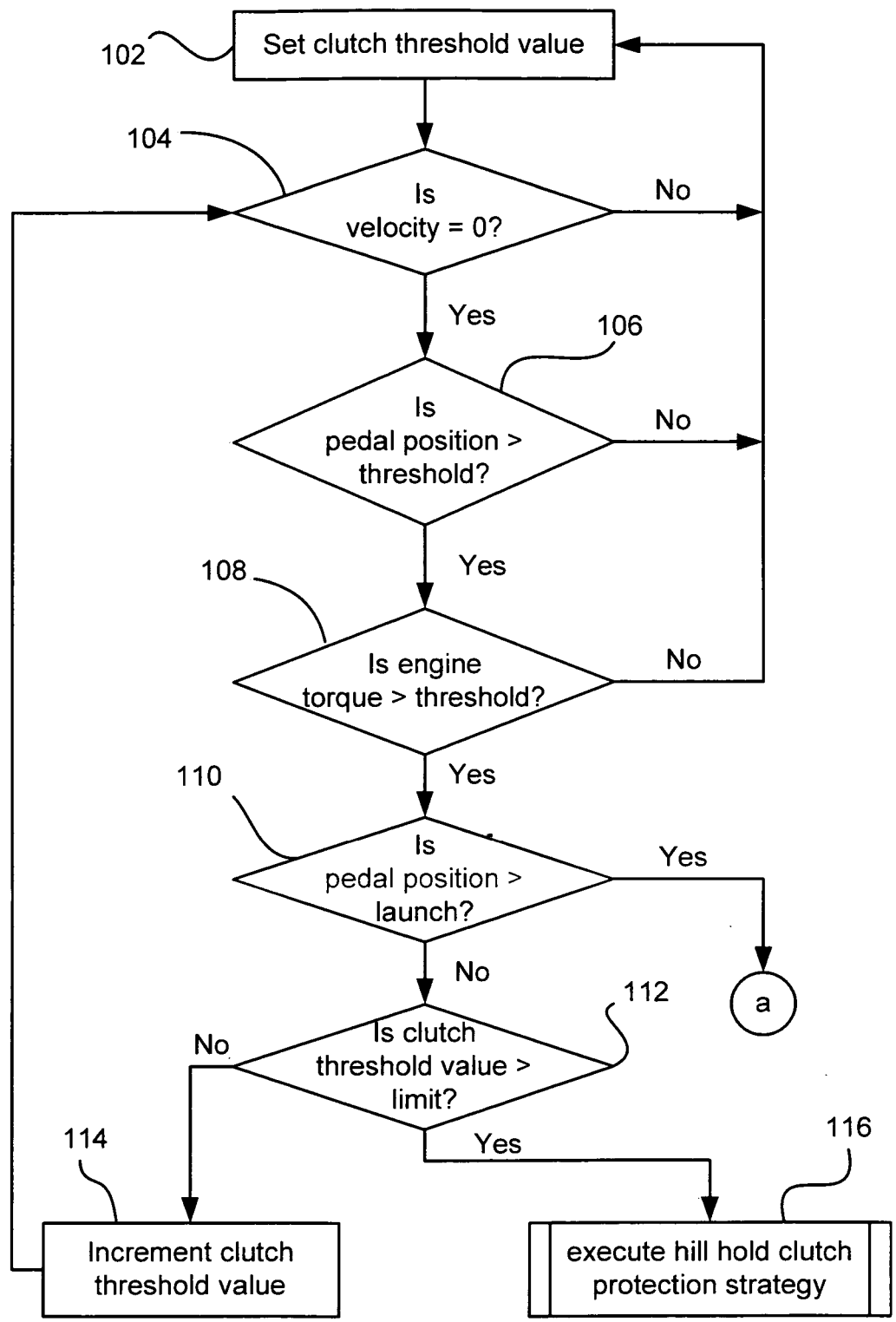
FIG. 3 is a flow chart disclosing a method of detecting a hill hold situation in accordance with an embodiment of the present invention.

FIG. 3 is a flow chart illustrating a method of detecting whether a hill hold situation exists, and may be applied to either of the vehicle powertrains 20, 20' shown in FIGS. 1 and 2, respectively. The hill hold situation is one where the vehicle is essentially at a standstill, in a forward or reverse gear, and the vehicle operator is maintaining the vehicle in this position by manipulating the accelerator pedal. As mentioned above, it is important to detect this situation since the clutch slippage can cause the temperature of the clutch to rise rapidly.

A clutch threshold value is set, block 102. This clutch threshold value is related to the estimated temperature (heat build-up) in the clutch. It may be a temperature or a time value and may be a look up table based on empirical data or a mathematical model of heat transfer for the clutch. The estimation may include such factors as, for example, the input energy due to the amount of slip and applied torque, cooling factor based on the ability of the clutch to dissipate heat, and the thermal mass of the clutch. Or, as an alternative, the estimated temperature may be based on a temperature sensor.

With the vehicle in a forward or reverse gear, a determination is made as to whether the velocity of the vehicle is approximately zero, block 104. If not, then the vehicle is obviously not in a hill hold situation, so the routine starts over. If so, then the pedal position is compared to a hill hold threshold, block 106. This pedal position threshold is an amount greater than zero but less than what would be deemed a demand by the vehicle operator to launch the vehicle. Essentially a position in a range where the vehicle operator may be attempting to hold the vehicle in place by manipulation of the accelerator pedal. If the pedal position is not above the hill hold threshold, then the routine starts over. If it is above the hill hold threshold, a determination is made as to whether the engine torque is greater than a predetermined minimum torque threshold, block 108. If not, then the routine starts over. If it is above the torque threshold, then a determination is made as to whether the pedal position is above a launch threshold, block 110. The launch threshold is a pedal position above which would be deemed a demand by the vehicle operator to launch the vehicle. If above this launch threshold, then the routine jumps to execution of a vehicle launch, which is shown as block 218 in FIG. 4A (for a vehicle employing an antilock brake or traction control system for clutch protection) or block 316 in FIG. 4B (for a vehicle that does not employ an antilock brake or traction control system for clutch protection). If the pedal position is not above the launch threshold, then the vehicle is determined to be in a hill hold mode.

A determination is now made as to whether the clutch threshold value is greater than a predetermined limit, block 112. This predetermined limit will be a time or a temperature value corresponding to the clutch threshold value. For example, it may be a temperature of two hundred or three hundred degrees Celsius, or an amount of time that the clutch has been slipping. The predetermine limit is one where, above the limit, a concern arises that the clutch may begin to experience undue wear or possible damage due to heat build-up. If the clutch threshold is not above the predetermined limit, then the clutch threshold value is incremented, block 114, and the steps are repeated to determine if the vehicle is still in a hill hold mode. The amount the threshold value is incremented relates to an estimated incremental increase in the heat build-up in the clutch as the vehicle remains in the hill hold mode. If, on the other hand, the clutch threshold is above the predetermined limit, then a hill hold clutch protection strategy is implemented, block 116.

Figure 4A:
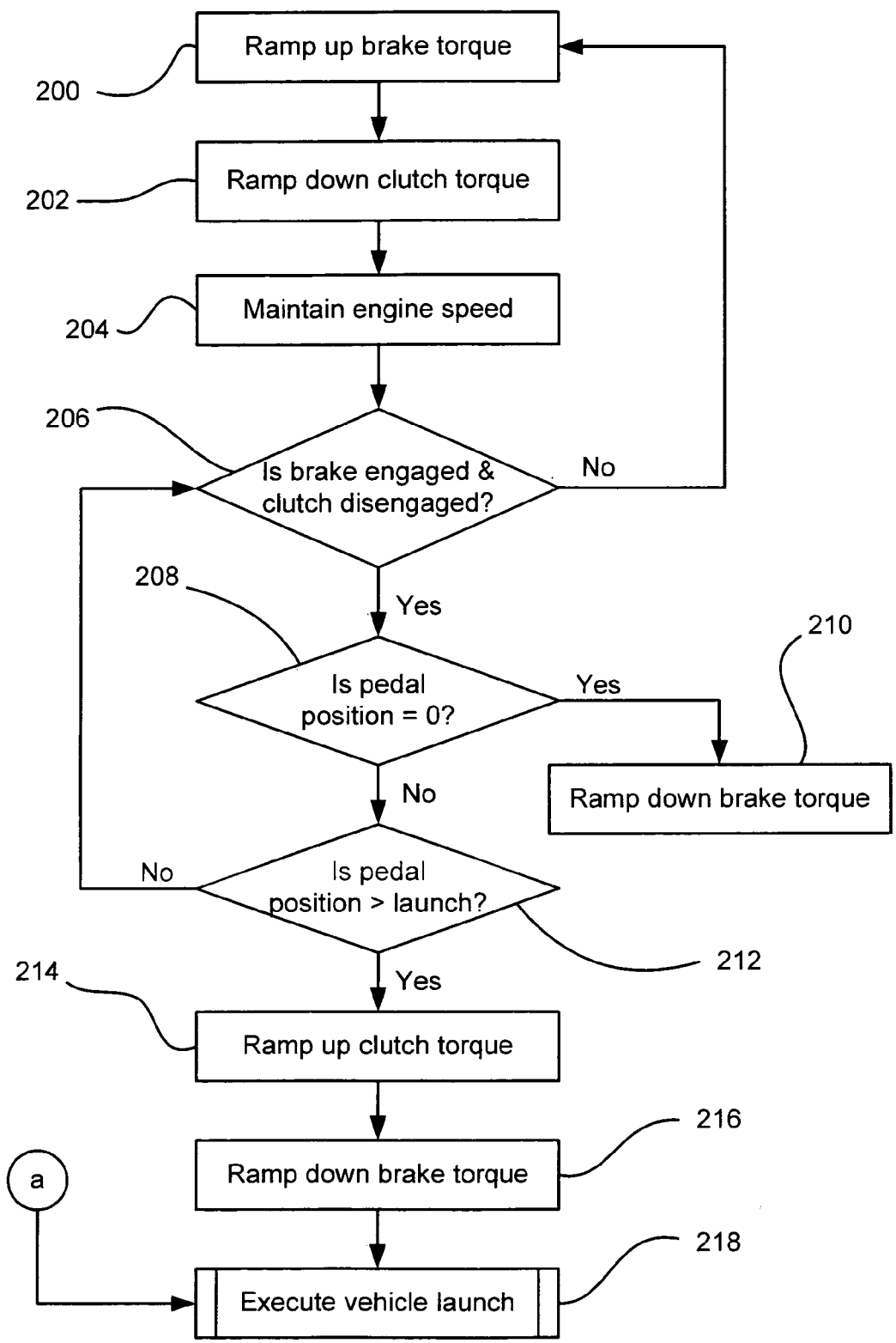
FIG. 4A is a flow chart disclosing a method of executing a hill hold clutch protection strategy in accordance with an embodiment of the present invention.
Figure 4B:
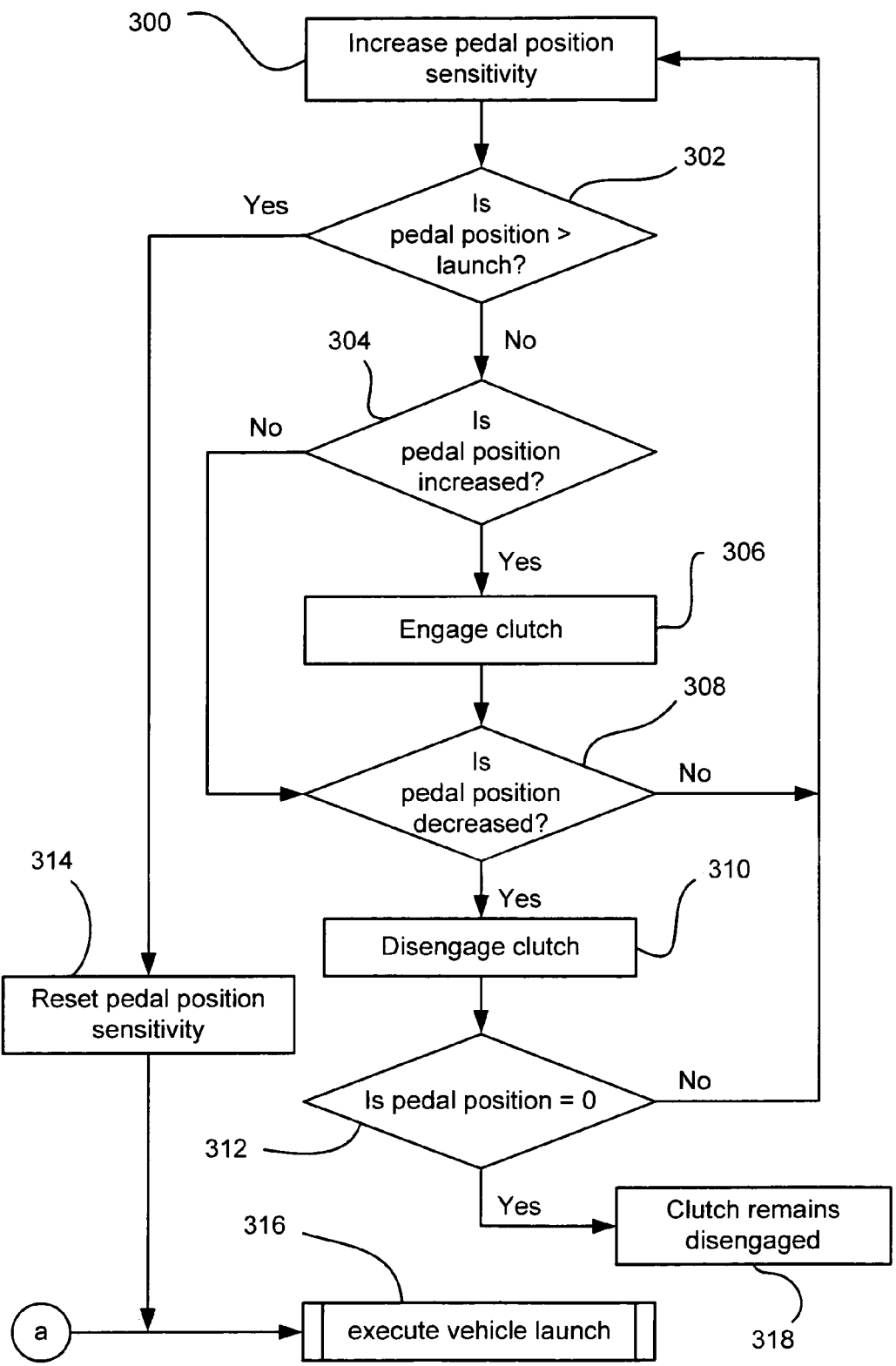
FIG. 4B is a flow chart similar to FIG. 3A, but illustrating a method of executing a hill hold clutch protection strategy in accordance with another embodiment of the present invention

The hill hold clutch protection strategy implemented for a vehicle depends upon whether that vehicle has antilock brakes and/or traction control or not. For a vehicle with antilock brakes and/or traction control (that is, one where the brakes can be automatically actuated), the embodiment of the hill hold clutch protection strategy shown in FIG. 4A is preferably employed. For a vehicle without antilock brakes or traction control, the embodiment of the hill hold clutch protection strategy shown in FIG. 4B is employed. For example, a vehicle such as that in FIG. 1 may employ the strategy of either FIG. 4A or 4B, although the strategy of FIG. 4A is preferred, while a vehicle such as that in FIG. 2 will employ the strategy of FIG. 4B. Either way, these strategies are applicable to both powershift and automated manual transmissions where a clutch or clutches are used in place of a torque converter.

For the hill hold clutch protection strategy shown in FIG. 4A, it begins with ramping up the brake torque, block 200, and ramping down the clutch torque, block 202. Preferably, the brake torque is ramped up somewhat faster than the clutch torque is ramped down so that the vehicle maintains its position on the hill without beginning to roll backwards. Optionally, while the clutch torque is ramped down, the engine controls may be correspondingly adjusted (such as, for example, via the electronic throttle control) in order to maintain the engine speed, block 204. This will make the operation more transparent to the vehicle operator, thus lessening the potential for the vehicle operator to become concerned as this strategy is carried out. A determination is made as to whether the brakes are fully engaged and the clutch is fully disengaged, block 206. If not, then blocks 200, 202 and 204 continue this process. If they are, then, the clutch, being fully disengaged, will not build-up any more heat, while the brakes, being actuated, will hold the vehicle in place on the hill. All this is accomplished without requiring any vehicle operator intervention or even requiring that the vehicle operator knows of the switch from clutch torque to brake torque.

The vehicle can now remain in this hill hold mode until the vehicle operator initiates a change in the accelerator pedal position sufficient to indicate a desire to leave the hill hold mode. If the accelerator pedal position is reduced by the vehicle operator to approximately zero, block 208, then the brake torque is ramped down, block 210. As the brake torque is ramped down, then, the vehicle can roll backwards on the hill. If the accelerator pedal position is increased above the vehicle launch threshold, block 212, then the clutch torque is ramped up, block 214, while the brake torque is ramped down, block 216. In this situation, preferably the clutch torque is ramped up slightly faster than the brake torque is ramped down so the vehicle does not have a tendency to roll backwards on the hill during the transition. The vehicle launch strategy, block 218, can then be executed. The particular strategy employed for controlling the engine, clutch and transmission shifting during the execution of the vehicle launch does not form a part of the invention herein and so will not be discussed further.

For the hill hold clutch protection strategy shown in FIG. 4B, it begins with increasing the pedal position sensitivity, block 300. A determination is made whether the pedal position is now greater than the launch threshold, which, as discussed above, is a pedal position above which would be deemed a demand by the vehicle operator to launch the vehicle. If above this launch threshold, then the pedal position sensitivity is reset to its normal level, block 314, and a vehicle launch is executed, block 316.

If the pedal position is not greater than the launch threshold, then a determination is made as to whether the pedal position has increased, block 304. Since the pedal position sensitivity has been increased, the pedal position increase may be a relatively small movement and still be detected as an increase. If a pedal position increase is detected, then the clutch is fully engaged, block 306. If there is no increase, a determination is made whether the pedal position is decreased, block 308. Again, since the sensitivity of the pedal position has been increased, even a small movement may be detected. If there is no decrease in the pedal position, then the pedal position sensitivity is increased again, and a check is made for an increase or decrease in the pedal position. If a decrease in the pedal position is detected, then the clutch is fully disengaged, block 310. If the pedal position is now about zero, block 312, then the vehicle operator has likely switched to the brake to hold the vehicle in place, so the clutch remains disengaged, block 318. If not zero, then the pedal position sensitivity is increased again and checks for increase or decrease in pedal position are made again. Alternatively, the pedal position sensitivity may be increased more significantly the first time, without incremental increases later. The pedal position checks, then, would repeatedly occur without incrementally increasing the pedal position sensitivity between checks.

Since, with this process, the clutch is generally completely engaged or disengaged—rather than in a continuous state of slipping—the amount of heat building-up in the clutch should be greatly reduced. Moreover, the increased sensitivity of the accelerator pedal may discourage the driver from employing the accelerator pedal as a means for maintaining the vehicle on a hill. The process makes it extremely difficult for the vehicle operator to hold the vehicle steady on a hill by manipulation of the accelerator pedal alone. After a few cycles with the increased pedal position sensitivity, the vehicle operator will most likely remove his foot from the accelerator pedal and use the most appropriate device to hold the vehicle on a hill—the brake.

Yet, despite the increase in pedal position sensitivity and switching between full engagement and full disengagement of the clutch, this process still leaves the vehicle operator in control of the vehicle. Thus, the concerns that may arise for a vehicle operator with some prior art systems are eliminated.

While certain embodiments of the present invention have been described in detail, those familiar with the art to which this invention relates will recognize various alternative designs and embodiments for practicing the invention as defined by the following claims.

What is claimed is:

1. A method of performing a hill hold on a vehicle having a clutch that selectively connects an output of an engine to an input of a transmission, the method comprising the steps of:
   (a) detecting the vehicle is in a hill hold situation;
   (b) automatically increasing an accelerator pedal position sensitivity for an accelerator pedal in an electronic throttle control system if the vehicle is detected to be in the hill hold situation;
   (c) detecting an increase or a decrease in a position of the accelerator pedal;
   (d) automatically fully engaging the clutch if the increase in the position of the accelerator pedal is detected; and
   (e) automatically fully disengaging the clutch if the decrease in the position of the accelerator pedal is detected.

2. The method of claim 1 further including: after step (a), waiting a predetermined time before executing step (b).

3. The method of claim 1 further including: after step (a), estimating a clutch temperature, and waiting until the estimated clutch temperature exceeds a predetermined limit before executing step (b).

4. The method of claim 3 wherein step (a) is further defined by a velocity of the vehicle being zero, a position of the accelerator pedal being greater than a predetermined pedal position threshold, and an engine torque being greater than a predetermined torque threshold.

5. The method of claim 1 wherein step (a) is further defined by a velocity of the vehicle being zero, a position of the accelerator pedal being greater than a predetermined pedal position threshold, and an engine torque being greater than a predetermined torque threshold.

6. The method of claim 1 further including the steps of:
   (f) detecting the position of the accelerator pedal to be greater than a predetermined vehicle launch pedal position;
   (g) reducing the pedal position sensitivity to an initial pedal position sensitivity; and
   (h) automatically engaging the clutch if the clutch is disengaged when step (f) occurs.

7. A method of performing a hill hold on a vehicle having a clutch that selectively connects an output of an engine to an input of a transmission, the method comprising the steps of:
   (a) detecting the vehicle is in a hill hold situation;
   (b) automatically increasing an accelerator pedal position sensitivity for an accelerator pedal in an electronic throttle control system if the vehicle is detected to be in the hill hold situation;
   (c) detecting an increase or a decrease in a position of the accelerator pedal;
   (d) automatically fully engaging the clutch if the increase in the position of the accelerator pedal is detected;
   (e) automatically fully disengaging the clutch if the decrease in the position of the accelerator pedal is detected;
   (f) detecting the position of the accelerator pedal to be greater than a predetermined vehicle launch pedal position;
   (g) reducing the pedal position sensitivity to an initial pedal position sensitivity if the position of the accelerator pedal is detected to be greater than the predetermined vehicle launch pedal position; and
   (h) automatically engaging the clutch if the clutch is disengaged when step (f) occurs.

8. The method of claim 7 further including: after step (a), waiting a predetermined time before executing step (b).

9. The method of claim 8 wherein step (a) is further defined by a velocity of the vehicle being zero, a position of the accelerator pedal being greater than a predetermined pedal position threshold, and an engine torque being greater than a predetermined torque threshold.

10. The method of claim 7 further including: after step (a), estimating a clutch temperature, and waiting until the estimated clutch temperature exceeds a predetermined limit before executing step (b).

11. The method of claim 10 wherein step (a) is further defined by a velocity of the vehicle being zero, a position of the accelerator pedal being greater than a predetermined pedal position threshold, and an engine torque being greater than a predetermined torque threshold.

12. The method of claim 7 wherein step (a) is further defined by a velocity of the vehicle being zero, a position of the accelerator pedal being greater than a predetermined pedal position threshold, and an engine torque being greater than a predetermined torque threshold.

13. A vehicle comprising:
an engine having an electronically controlled throttle and an output;
a transmission having an input;
a clutch having a clutch input operatively engaging the output of the engine, a clutch output operatively engaging the input of the transmission, and a clutch actuator for selectively engaging the clutch input to the clutch output;
an accelerator pedal having a pedal position sensor; and
a control unit in communication with the clutch actuator, pedal position sensor and electronically controlled throttle, and including a hill hold clutch protector that detects when the vehicle is in a hill hold situation, and when a hill hold situation is detected increases an accelerator pedal position sensitivity for the accelerator pedal, fully engages the clutch if an increase in a position of the accelerator pedal is detected and fully disengages the clutch if a decrease in the position of the accelerator pedal is detected.

14. The vehicle of claim 13 wherein the transmission is a powershift transmission.

15. The vehicle of claim 14 wherein the clutch is a dry clutch.

16. The vehicle of claim 13 wherein the transmission is an automated manual transmission.

17. The vehicle of claim 16 wherein the clutch is a dry clutch.

18. The vehicle of claim 13 wherein the clutch is a dry clutch.

* * * * *